(12) United States Patent
Augustat et al.

(10) Patent No.: US 10,205,339 B2
(45) Date of Patent: Feb. 12, 2019

(54) INSERT FOR AN AIRCRAFT GALLEY FOR STORING AND CHARGING PERSONAL ELECTRONIC DEVICES (PEDS)

(71) Applicant: Airbus Operations GmbH, Hamburg (DE)

(72) Inventors: Sven Augustat, Hamburg (DE); Kaya Sahin, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 29 days.

(21) Appl. No.: 15/384,876

(22) Filed: Dec. 20, 2016

(65) Prior Publication Data

US 2017/0179756 A1 Jun. 22, 2017

(30) Foreign Application Priority Data

Dec. 21, 2015 (DE) .................... 20 2015 106 958 U

(51) Int. Cl.
| | |
|---|---|
| *H02J 7/00* | (2006.01) |
| *H02J 7/14* | (2006.01) |
| *B64D 11/04* | (2006.01) |
| *H01R 24/60* | (2011.01) |
| *B64D 45/00* | (2006.01) |

(52) U.S. Cl.
CPC ............ *H02J 7/1423* (2013.01); *B64D 11/04* (2013.01); *H01R 24/60* (2013.01); *H02J 7/0003* (2013.01); *H02J 7/0044* (2013.01); *H02J 7/1453* (2013.01); *H02J 7/1461* (2013.01); *B64D 2045/0075* (2013.01)

(58) Field of Classification Search
CPC ...... H02J 7/1423; H02J 7/0003; H02J 7/0044; H02J 7/1453; H02J 7/1461; H01R 24/60; B64D 11/04
USPC ......................................... 320/110
See application file for complete search history.

(56) References Cited

U.S. PATENT DOCUMENTS

| | | | | |
|---|---|---|---|---|
| 9,548,623 | B2 * | 1/2017 | Bruechmann | H04B 5/0031 |
| 9,607,301 | B2 * | 3/2017 | Gaudiana | G06Q 30/00 |
| 9,815,363 | B2 * | 11/2017 | Biderman | B60K 7/0007 |
| 2005/0257827 | A1 * | 11/2005 | Gaudiana | H01G 9/2068 |
| | | | | 136/263 |

(Continued)

OTHER PUBLICATIONS

Arinc Specification 812A, Aug. 26, 2014.
Arinc Specification 810-5, Nov. 23, 2015.

*Primary Examiner* — M Baye Diao
(74) *Attorney, Agent, or Firm* — Greer, Burns & Crain, Ltd.

(57) ABSTRACT

An insert for an aircraft galley for storing and charging personal electronic devices (PEDs), wherein the insert includes at least one physical interface and at least one data and power interface in accordance with the ARINC standard. In an open state, the insert is suitable for introducing the PEDs into the insert, and in the closed state, it is suitable for storing and charging the PEDs. The insert includes: a module for providing the respective electric power to the PEDs required by the PEDs for charging, wherein electric power is provided to the module via the data and power interface; standardized electric plugs for connecting the PEDs to the module; one or multiple temperature sensors for measuring the temperature in the interior of the insert; and a heat dissipation arrangement.

14 Claims, 1 Drawing Sheet

(56) References Cited

U.S. PATENT DOCUMENTS

| | | | | |
|---|---|---|---|---|
| 2006/0030983 A1* | 2/2006 | Bautista | ............... | G07C 5/008 |
| | | | | 701/31.4 |
| 2015/0319378 A1* | 11/2015 | Hoelter | ............... | H04N 5/2257 |
| | | | | 348/164 |
| 2016/0204644 A1* | 7/2016 | Dukerschein | ......... | H02J 7/0047 |
| | | | | 320/108 |

* cited by examiner

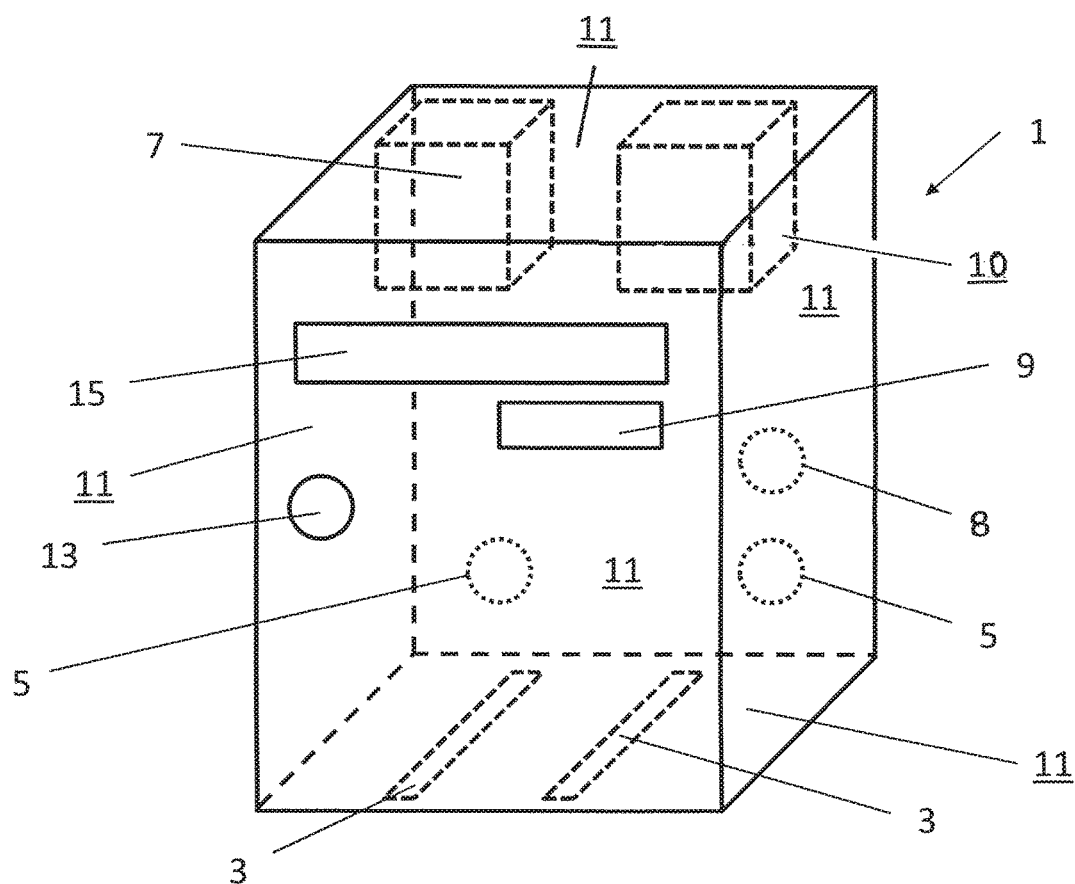

INSERT FOR AN AIRCRAFT GALLEY FOR STORING AND CHARGING PERSONAL ELECTRONIC DEVICES (PEDS)

CROSS-REFERENCES TO RELATED APPLICATIONS

This application claims the benefit of the German patent application No. 202015106958.8 filed on Dec. 21, 2015, the entire disclosures of which are incorporated herein by way of reference.

BACKGROUND OF THE INVENTION

The present invention relates to an insert for an aircraft galley for storing and charging personal electronic devices (PEDs). The term aircraft presently includes, in particular, passenger aircraft.

Such inserts are also referred to as galley inserts (GAINs). GAINs conventionally include standard ARINC interfaces in accordance with ARINC 810(11/23/2015) and 812A (8/26/2014).

Flight attendants and pilots increasingly require PEDs for working on board an aircraft. These PEDs are required by the crew for multiple aircraft; therefore, it must be possible to transport them in a simple manner. Here, on the one hand, it is desirable that the PEDs are available and operational. On the other hand, it must be possible to store the PEDs in a theft-proof manner.

Conventional options for charging the batteries include, for example, normal SI sockets which, however, are only available on a limited basis on board an aircraft. In addition, for reasons of security, crew devices must also not be left lying around and freely accessible to passengers. In addition, a suitable adapter must be kept on hand for each PED. The transport of a plurality of PEDs thus entails logistical effort. In addition, the variety of cables which are required for charging creates unnecessary weight, particularly since all devices do not always have to be charged simultaneously.

SUMMARY OF THE INVENTION

It is thus an object of the present invention to provide an easily exchangeable storage option for PEDs of aircraft crews which, in addition, is also suitable for charging the PEDs.

The insert for an aircraft galley according to the present invention for storing and charging personal electronic devices (PEDs) includes at least one physical interface and at least one data and power interface in accordance with the ARINC standard. The insert is attached to the galley by means of (via) the physical interface which, for example, may be rail-shaped. The data and power interface may in turn, for example, be connected to various aircraft systems by means of a CAN bus. A data and power interface may presently be designed either as a shared terminal or as two separate terminals. In the open state, the insert is suitable for introducing the PEDs into the insert, and in the closed state, it is suitable for storing and charging the PEDs. This may, for example, be achieved via a door or a cover.

In the case of use as a GAIN, the insert may be slid into a compartment of an aircraft galley in such a way that it locks flush with the other GAINs and forms an essentially smooth galley front.

The insert according to the present invention furthermore includes a module for providing the respective electric power to the PEDs which is required by the PEDs for charging, wherein electric power is provided to the module via the data and power interface; as well as standardized electrical plugs for connecting the PEDs to the module. The insert includes one or multiple temperature sensors for measuring the temperature in the interior of the insert, and has an arrangement for heat dissipation. In this case, the term "arrangement for heat dissipation" also includes a cooling arrangement.

Such an insert according to the present invention may advantageously also be exchanged with other GAINs, so that high flexibility in the galley arrangement of the GAINs is ensured.

In another embodiment, the insert may furthermore include a display for depicting the temperature ascertained by means of the temperature sensor. In this way, it is possible to display and check the state of the insert visually.

In another, preferred embodiment, the temperature ascertained by means of the temperature sensor is transmittable, for example, to an aircraft cabin system via the data and power interface. In this way, centralized monitoring of the insert is also possible.

Preferably, the module is suitable for providing the electric power of 230 V AC or 115 V AC which is required by the PEDs. These are the conventional grid voltage values for operating a PED. The module may be a conventional voltage converter which is electrically connected to the data and power interface.

In one preferred embodiment, the module for providing the electric power required by the PEDs is designed to be integral with the insert. In this way, a space-saving design of the insert is possible, so that a plurality of PEDs may be charged and stored.

The insert may furthermore include electrical terminals on the exterior which enable simple charging of PEDs if the insert, for example, is completely full, or if longer charging of the PED in the insert is not possible due to lack of time.

In an additional embodiment according to the present invention, the standardized electrical plug for providing the electric power to the PEDs is a USB plug. However, of course, other standard plugs are conceivable, for example, SI plugs.

In the closed state of the insert, the PEDs introduced into the insert are surrounded by fire-resistant, explosion-proof material. In the case of batteries, in particular lithium-ion batteries, particular measures are possibly necessary in order to prevent a fire or to take countermeasures. Relevant recommendations are issued by the International Air Transport Association (IATA).

Preferably, the insert furthermore has a lock for locking the insert, so that the insert is in a locked state after locking. In the closed state of the insert, locking takes place via a key. Thus, the PEDs may, for example, also remain on board the aircraft during maintenance or cleaning work.

A lock required for locking the insert may, for example, be operated via a conventional manual key or via an electronic key. In this case, for example, radio or frequency-based locking mechanisms or number combinations are conceivable.

In an additional embodiment, an interruption of the provision of electric power to the module, or of the provision of the electric power to the PEDs, preferably takes place preventively, as soon as the insert is in a locked state.

In one particularly preferred embodiment of the present invention, the insert furthermore includes a control display for displaying at least one charging status of at least one PED. In this way, it is easy to detect whether a PED is again operational. Such a control display may, for example, be a text display or a color-coded display (for example, red and green).

In another embodiment, the insert furthermore includes a holder for a PED for securing the PED, wherein the holder is accessible from outside the insert in the closed state of the insert. In this way, PEDs lying around loose, and disadvantageous cable leads, are avoided during the charging process outside the insert.

The present invention furthermore comprises an aircraft galley including the above-described insert. Advantageously, a flexible exchange of different GAINs is possible by means of the standardized embodiment of the insert according to the present invention.

In addition, the present invention also relates to an aircraft including an aircraft galley in which an insert according to the present invention is arranged.

BRIEF DESCRIPTION OF THE DRAWINGS

The present invention is described below with reference to the drawing.

The FIGURE shows a perspective view of the insert according to the present invention for an aircraft galley for storing and charging personal electronic devices.

DETAILED DESCRIPTION OF THE PREFERRED EMBODIMENTS

In the FIGURE, the insert 1 according to the present invention for an aircraft galley for storing and charging personal electronic devices is viewed in a closed state. This insert 1, also referred to as a galley insert (GAIN), presently includes two physical interfaces 3 in accordance with the ARINC standard for the mechanical connection of the insert 1 to the structure of the aircraft galley. These physical interfaces 3 are shown as rail-shaped.

The depicted insert 1 presently furthermore includes two data and power interfaces 5 in accordance with the ARINC standard. The data and power interfaces 5 may, for example, be suitable for enabling a connection to a CAN bus, so that the insert 1 may be connected, for example, to an aircraft cabin system. Presently, in FIG. 1, the one interface 5 is, for example, a power interface for supplying power. The other interface 5 is, for example, connected to the CAN bus and is suitable as a data interface for data transmission by means of pin programming.

The insert 1 furthermore includes a module 7 for providing the electric power (for example, 230 V AC or 115 V AC) required by the PEDs for charging, and it includes standardized electrical plugs (not shown) for connecting the PEDs to the module 7.

Furthermore, according to the present invention, one or multiple temperature sensors 8 are provided for measuring the temperature in the interior of the insert 1. The insert also includes an arrangement for heat dissipation 10. In this case, the term "arrangement for heat dissipation" also includes a cooling arrangement, so that the arrangement for heat dissipation 10 could be a passive system, such as heat sinks, or an active system, including powered ventilation or a circulating fluid, as is known in the art.

As shown in FIG. 1 by way of example, the insert 1 furthermore has a display 9 for depicting the temperature ascertained by means of the temperature sensor 8, so the state of the insert 1 may be visually displayed and checked. The display 9 may, for example, be an electronic display.

The temperature may be transmitted to the aircraft cabin system via the data and power interfaces 5, so that centralized monitoring of the insert 1 is possible. In this way, an increase in temperature may be quickly and simply detected, so that appropriate measures for preventing a fire may be promptly taken. Preferably, the walls 11 of the insert 1 are made of fire-resistant, explosion-proof material, so that PEDs introduced into the insert 1 in the closed state of the insert are accommodated securely.

The depicted insert 1 according to the present invention is lockable in its depicted closed state, so that the insert 1 is in a locked state after locking. For this purpose, a lock 13 is situated on the insert which, for example, may be operated via a conventional key or via an electronic key. In this case, for example, radio or frequency-based locking mechanisms or number combinations are conceivable.

Preferably, an interruption of the provision of electric power to the module 7 or the provision of the electric power to the PEDs occurs as soon as the insert 1 is in a locked state. This may be necessary for reasons of safety or authorization.

In the depicted particularly preferred embodiment of the present invention, the insert 1 furthermore has a control display 15 for displaying at least one charging status of at least one PED. In this way, it may be quickly detected whether a PED is again operational, without opening the insert 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 Insert
3 Physical interfaces
5 Data interfaces
7 Module for providing electric power
8 Temperature sensor
9 Display for depicting the temperature
10 Arrangement for heat dissipation
11 Walls of the insert (1)
13 Lock
15 Control display

The invention claimed is:
1. An insert for an aircraft galley for storing and charging personal electronic devices (PEDs), comprising:
 at least one physical interface and at least one data and power interface in accordance with the ARINC 810 and 812A standards,
 wherein in an open state, the insert is suitable for introducing the PEDs into the insert, and in a closed state, it is configured to store and charge the PEDs, a module for providing the respective electric power to the PEDs required by the PEDs for charging, wherein electric power is provided to the module via the data and power interface, standardized electric plugs for connecting the PEDs to the module, one or multiple temperature sensors for measuring the temperature in the interior of the insert, and a heat dissipation arrangement.

2. The insert for an aircraft galley according to claim 1, wherein the insert further includes a display for depicting the temperature ascertained via the temperature sensor.

3. The insert for an aircraft galley according to claim 1, wherein the temperature ascertained via the temperature sensor is transmittable to an aircraft cabin system via the data and power interface, to allow for centralized monitoring of the insert.

4. The insert for an aircraft galley according to claim 1, wherein the module is configured to provide the electric power at one of 230 V AC or 115 V AC, as required by the PEDs.

5. The insert for an aircraft galley according to claim 1, wherein the module for providing the electric power required by the PEDs is configured to be integral with the insert.

6. The insert for an aircraft galley according to claim 1, wherein the standardized electric plug for providing the electric power to the PEDs is a USB plug.

7. The insert for an aircraft galley according to claim 1, wherein PEDs introduced into the insert are surrounded by fire-resistant, explosion-proof material in the closed state of the insert.

8. The insert for an aircraft galley according to claim 1, wherein the insert further comprises a lock for locking the insert, so that the insert is in a locked state after locking.

9. The insert for an aircraft galley according to claim 8, wherein the lock is an electronic lock.

10. The insert for an aircraft galley according to claim 8, configured such that there is an interruption of at least one of:

the provision of electric power to the module, or the provision of electric power to the PEDs, that takes place as soon as the insert is in a locked state.

11. The insert for an aircraft galley according to claim 1, wherein the insert further has a control display configured to display at least one charging status of at least one PED.

12. The insert for an aircraft galley according to claim 1, wherein the insert further has a holder for a PED for securing the PED, wherein the holder is accessible from outside the insert in the closed state of the insert.

13. An aircraft galley including an insert according to claim 1.

14. An aircraft including an aircraft galley according to claim 13.

* * * * *